United States Patent [19]
Pond et al.

[11] Patent Number: 6,036,201
[45] Date of Patent: Mar. 14, 2000

[54] ADJUSTABLE VEHICLE SUSPENSION

[75] Inventors: James E. Pond, Twin Lake; Bruce B. McKinstry, Habbarston, both of Mich.

[73] Assignee: General Dynamics Land Systems, Muskegon, Mich.

[21] Appl. No.: 09/027,886

[22] Filed: Feb. 23, 1998

[51] Int. Cl.$^7$ ........................................... B60S 9/10
[52] U.S. Cl. ..................... 280/5.514; 280/5.52; 280/6.15
[58] Field of Search ................. 280/5.514, 5.52, 280/6.15, 6.153, 6.157, 124.159, 124.16; 188/322.19, 322.13, 322.17; 267/64.12, 64.16

[56] References Cited

U.S. PATENT DOCUMENTS

| | | | |
|---|---|---|---|
| Re. 27,883 | 1/1974 | Vogel et al. | 280/6.159 |
| 2,818,273 | 12/1957 | Weihsmann | 280/5.514 |
| 3,181,878 | 5/1965 | Vogel | 280/5.507 |
| 3,191,954 | 6/1965 | Schuetz | 280/6.153 |
| 4,186,815 | 2/1980 | Hart | 180/41 |
| 4,310,173 | 1/1982 | Varady | 280/6.15 |
| 4,462,610 | 7/1984 | Saito et al. | 280/6.159 |
| 4,648,623 | 3/1987 | Cameron | 280/711 |
| 4,958,584 | 9/1990 | Williamson | 114/270 |
| 5,098,120 | 3/1992 | Hayashi et al. | 267/276 |
| 5,265,902 | 11/1993 | Lewis | 280/124.102 |

*Primary Examiner*—J. J. Swann
*Assistant Examiner*—David R. Dunn
*Attorney, Agent, or Firm*—Brook & Kushman P.C.

[57] ABSTRACT

A suspension assembly for mounting a wheel assembly to any wheel position of a vehicle, the suspension assembly being pneumatically controlled to adjust both the ground clearance of the vehicle and its wheel-track width, the suspension assembly also being mountable at any wheel position whether the wheel at that position is to be steerable or nonsteerable. The suspension system includes upper and lower control arms connected between a frame attachable to the vehicle and a kingpin assembly to provide a parallelogram linkage. It also includes at least one pneumatically actuated linear actuator to control the angular disposition of the lower control arm with respect to the frame and thereby control the ground clearance and wheel-track width of the vehicle. The parallelogram geometry provides the upper and lower control arms with at least 120 degrees of angular travel. When in a stowed position, the control arms are nearly vertical and fit, with the kingpin, within a space effectively equal to that occupied by the linear actuators and the frame. The disposition of the suspension assembly components is such that wheels are drivable with wheel-mounted electric drives, inboard-mounted electric drives, or a conventional engine drive.

18 Claims, 7 Drawing Sheets

ADJUSTABLE VEHICLE SUSPENSION

TECHNICAL FIELD

This invention relates generally to vehicle suspensions and more specifically to collapsible suspensions having dynamically adjustable geometries.

BACKGROUND ART

Suspension systems that adjust the height, or ground clearance, of a vehicle have been known for some time. A suspension assembly that adjusts the track width of a vehicle, however, is unknown to the applicants. A fully interchangeable suspension assembly, that is, one that can be readily exchanged in a left-to-right, front-to-back, steerable-to-nonsteerable, and driven-to-nondriven manner, is also unknown to the applicants, as is a dual control arm suspension that has at least 120 degrees of angular travel and that swings into an upright stowed position within a relatively shallow recess.

DISCLOSURE OF THE INVENTION

An object of the present invention is to provide an improved suspension assembly that includes a kingpin assembly for connecting a wheel assembly to a vehicle, the vertical and lateral positions of the kingpin assembly being adjustable to provide continuously variable vehicle ground clearance and variable wheel-track width respectively.

Another object is to provide a suspension assembly having a dual control arm suspension that allows more than 120 degrees of angular travel and that swings upwardly into an upright stowed position within a relatively shallow recess.

Still another object is to provide a side-mount, rather than subfloor, configuration of the suspension assembly that requires a minimum amount of lateral intrusion into the vehicle payload compartment and minimum exterior dimensions.

Yet another object is to provide a suspension assembly that can be used at any vehicle wheel position whether the wheel at that position is to be a steerable or nonsteerable wheel, a driven or nondriven wheel, a left or right wheel, or a front or back wheel.

A further object is to provide a suspension assembly that is compatible with either a conventional engine or electric drive units used to power driven wheels, the electric drive units being disposed either within the wheel assemblies or inboard.

A feature of the present invention is the use of upper and lower control arms connectable to a frame and a kingpin assembly to provide a parallelogram linkage and a linear actuator connected to the frame and the lower control arm to vary the vertical and lateral position of the kingpin assembly with respect to the frame.

An additional feature of one embodiment of the present invention is the use of control arms configured to swing between a pair of linear actuators to allow the adjustable suspension assembly, when swung into a vertically oriented stowed position, to fit within a recess having a depth effectively equal to that of a linear actuator and the frame.

An additional feature of another embodiment of the present invention is the use of wishbone-shaped control arms configured to swing outside a pair of combination air-strut-and-shock-absorber actuators and allow the adjustable suspension assembly, when swung into a vertically oriented stowed position, to fit within a recess having a depth effectively equal to the diameter of a linear actuator.

Another feature is that the connection of the upper and lower control arms and the linear actuator to the frame provides a modular, side-mounted bolt-on suspension assembly.

Still another feature is the use of dual actuators to adjust the suspension of a relatively heavy vehicle with relatively low pneumatic pressure.

Yet another feature is the use of shock absorbers integrated into the actuator rods to conserve space.

An advantage of the present invention is that the pneumatically controlled suspension provides continuously adjustable vehicle ground clearance and wheel-track width.

Another advantage is that the compressibility of the suspension assembly essentially allows additional ground clearance to be converted into additional payload-carrying capacity, which is especially important within height-constrained transport vehicles or craft.

Still another advantage is that the upper and lower control arms are generally horizontally disposed when the suspension assembly is in its most-commonly used, or highway, position, vertical wheel movement thus resulting in a minimum of lateral movement, the latter translating into a minimum of tire wear and suspension component stress.

Yet another advantage is that, as the adjustable suspension assembly approaches the stowed position, the direction in which the primary wheel loads act approaches the vertical; and most are effectively transferred to the pivoting upper and lower control arms, this minimizing or eliminating the need for a separately mounted bump stop and making the suspension assembly inherently self-limiting in terms of managing unexpectedly large dynamic input forces.

A further advantage is that the pneumatic equipment required to provide pressure to actuate the suspension assembly may be exploited to perform additional tasks such as active suspension enhancements, side slope operation, central tire inflation and load leveling and to facilitate cargo transfer and the use of pneumatic tools.

An additional advantage is that spreading the wheels away from the vehicle reduces mine blast vulnerability.

In realizing the aforementioned and other objects, features and advantages, the adjustable suspension assembly for connecting a wheel assembly to a vehicle includes a frame that is attachable to the vehicle. Upper and lower control arms having respective connections to the frame and to a kingpin assembly provide a parallelogram linkage. At least one linear actuator has a frame end connected to the frame above the upper control arm and has a control arm end connected to a central portion of the lower control arm.

In the preferred embodiment of the adjustable suspension assembly, the at least one linear actuator includes a pair of pneumatically actuated linear actuators. A cylinder housing extends from the frame end, and a piston is slidably disposed therewithin. A piston connecting shaft is connected to the piston and extends therefrom to the control arm end. Each piston connecting shaft has a longitudinal bore within which a hydraulically actuated bore shock absorber is disposed.

An alternative at least one linear actuator has a pair of linear actuators, each including a combination air strut and shock absorber. Alternative, wishbone-shaped, upper and lower control arms are used in this embodiment to swing outside the alternative linear actuators, thereby allowing the adjustable suspension assembly, when swung into a vertically oriented stowed position, to fit within a recess having a depth effectively equal to the diameter of a linear actuator.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figures 1, 2:
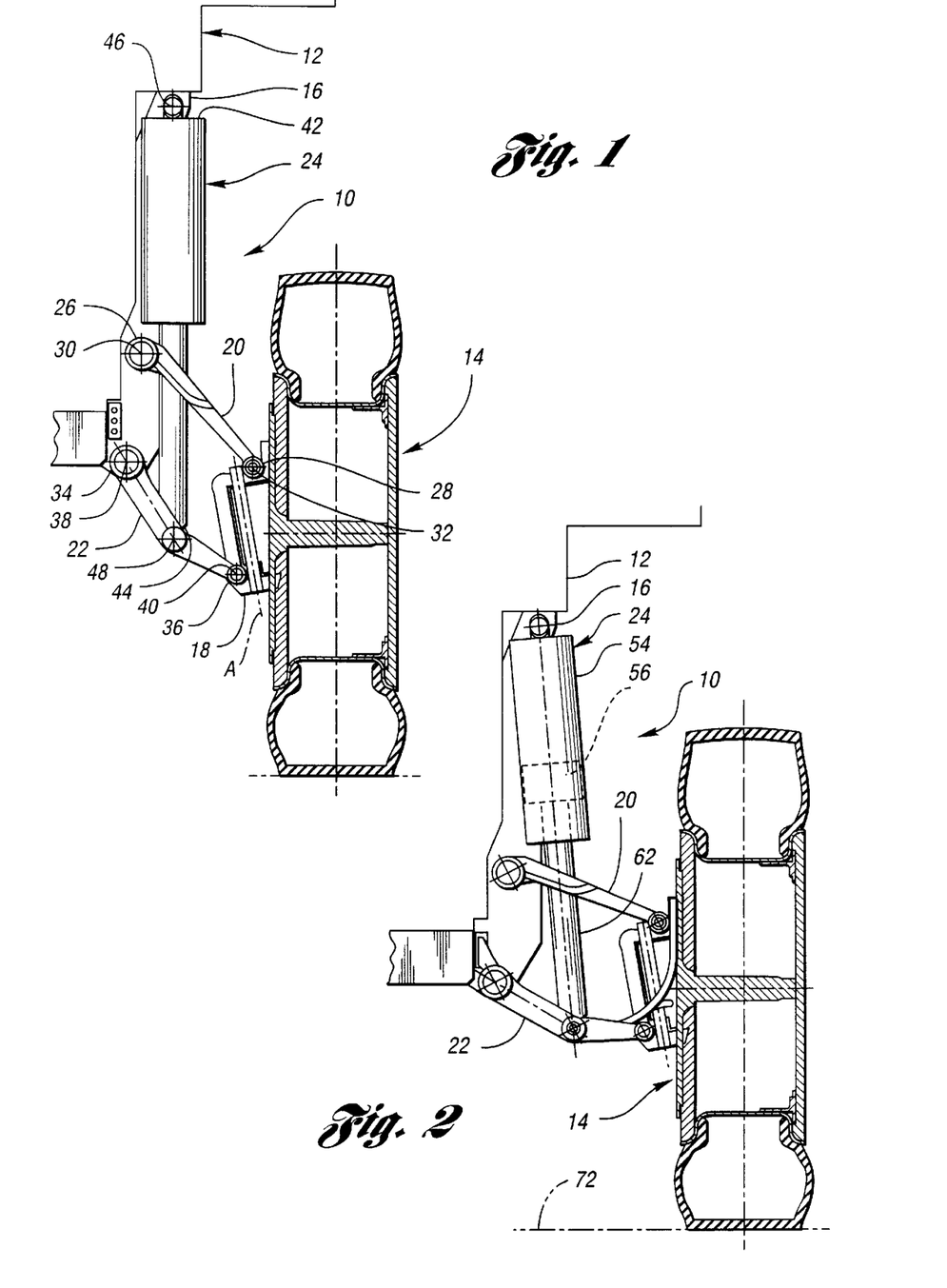
FIG. 1 is an end view, partly in section, of the preferred embodiment of the adjustable suspension assembly of the present invention attached to a vehicle and to a wheel assembly, the suspension assembly being shown in a full rebound position, wherein a linear actuator of the suspension assembly is vertically oriented and is at its maximum stroke.
FIG. 2 is a view similar to that of FIG. 1 but with the suspension assembly shown in a cross-country position.

FIG. 1 is an end view of the preferred embodiment of an adjustable suspension assembly of the present invention, which is generally indicated by the reference numeral 10. A vehicle is generally indicated by the reference numeral 12, and a wheel assembly is generally indicated by the reference numeral 14. The adjustable suspension assembly 10 includes a frame 16, a kingpin assembly 18, an upper control arm 20, a lower control arm 22, and at least one linear actuator 24. The frame 16 is shown attached to the vehicle 12.

The upper control arm 20 has a supported end 26 and a supporting end 28. The supported end 26 is pivotally connected to the suspension assembly frame 16 at an upper control arm frame attachment point 30, and the supporting end 28 is pivotally connected to the kingpin assembly 18 at an upper control arm kingpin attachment point 32. The lower control arm 22 has a supported end 34 and a supporting end 36. The supported end 34 is pivotally connected to the suspension assembly frame 16 at a lower control arm frame attachment point 38, and the supporting end 36 is pivotally connected to the kingpin assembly 18 at a lower control arm kingpin attachment point 40.

The upper and lower control arm frame attachment points, 30 and 38 respectively, and the upper and lower control arm kingpin attachment points, 32 and 40 respectively, represent four apexes of a parallelogram. The upper and lower control arms 20 and 22 have respective connections to the frame 16 and to the kingpin assembly 18 to form a parallelogram linkage, wherein opposite lines joining the apexes remain parallel when the suspension assembly 10 is in operation.

The at least one linear actuator 24 is pneumatically actuated and has a frame end 42 and a control arm end 44. The frame end 42 is pivotally attached to the frame 16 at an actuator cylinder attachment point 46, and the control arm end 44 is pivotally attached to the lower control arm 22 at an actuator piston attachment point 48 located generally centrally on the lower control arm 22.

It should be understood that more than one type of linear actuator 24 can be used in the adjustable suspension assembly 10 of the present invention. These types include a piston gas cylinder (FIG. 10), or an air bag or rolling-lobe seal cylinder (FIG. 11), the latter essentially being an air bag within a cylinder. The preferred adjustable suspension assembly 10 is designed to permit the use of linear actuator cylinders having diameters up to approximately 5.25 inches. These are large enough to handle a 10,000-pound 4×4 vehicle application by using a commercially standard air pressure of 100 psi. Narrower, but higher-pressure, cylinders can also be used if they are capable of accommodating the full motion of the lower control arms 22.

FIG. 1 shows the adjustable suspension assembly 10 in a full rebound position. In this position, the linear actuator 24 is vertically oriented and is at its maximum stroke. In the preferred embodiment, this position corresponds to a ground clearance of 24 inches. The suspension assembly 10 is capable of being adjusted to any position within its operating range; however, it has general positions that are suitable for particular terrain and types of driving. Three of these positions are illustrated. FIG. 2 shows the suspension assembly 10 in its uppermost, or cross-country, position, which provides the greatest ground clearance and jounce travel of the three positions. In the preferred embodiment, this position would be used for driving over rough, obstacle-containing terrain. The position corresponds to a ground clearance of 19 inches and provides for a wheel jounce of 10 inches.

Figure 3:
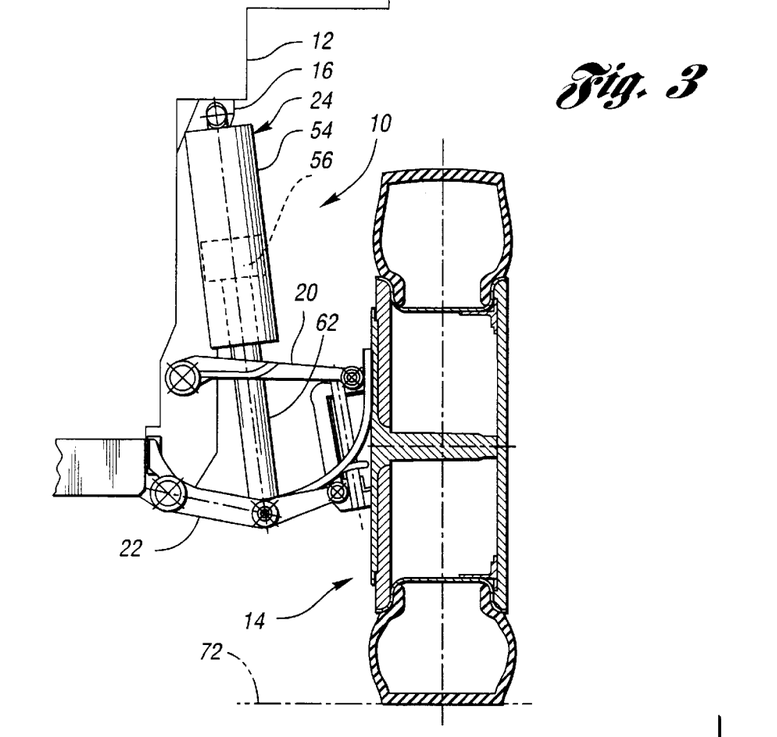
FIG. 3 is a view similar to that of FIG. 1, but with the suspension assembly shown in a highway position.

The position shown in FIG. 3 is the intermediate, or highway, position, which would be used for driving on relatively smooth streets and highways. This position, which has the upper and lower control arms 20 and 22 generally horizontally disposed, provides the greatest total wheel-track width and lateral roll stability. Furthermore, since the respective supporting ends 28 and 36 of the upper and lower control arms 20 and 22 describe circular paths when the control arms 20 and 22 are pivoted, the wheel 14 undergoes less lateral displacement as a function of its vertical movement when the upper and lower control arms 20 and 22 are horizontally disposed than when they are in any other position. Since the highway position is usually the most frequently used position, disadvantageous effects such as tire wear and suspension component stress are minimized by the geometry of this suspension assembly 10. Furthermore, maximum lateral roll stiffness is realized.

Figure 4:
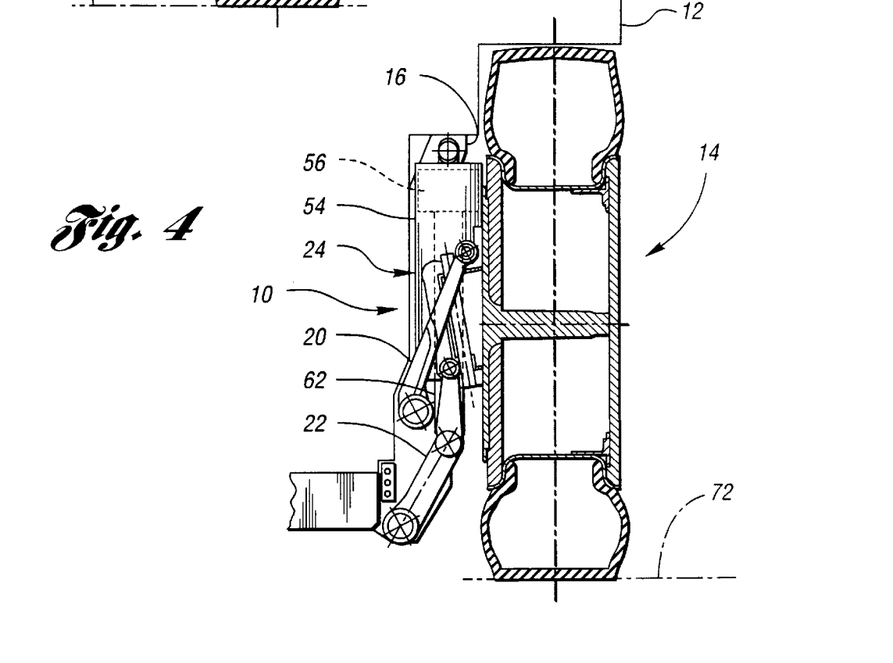
FIG. 4 is a view similar to that of FIG. 1, but with the suspension assembly shown in a stowed position.

The highway position corresponds to a ground clearance of 15 inches and provides for a wheel jounce of 5 inches. FIG. 4 shows the stowed suspension assembly position. This corresponds to a ground clearance of 4 inches. The stowed position provides the least total wheel-track width, the difference between it and the highway position being 15.5 inches.

As the suspension assembly 10 approaches the stowed position (FIG. 4), the direction in which the primary wheel loads act approaches the vertical; and most are effectively transferred to the pivoting upper and lower control arms 20 and 22. This essentially eliminates the need for a separately mounted bump stop, making the suspension assembly 10 inherently self-limiting in terms of managing unexpectedly large dynamic input forces.

Figure 5:
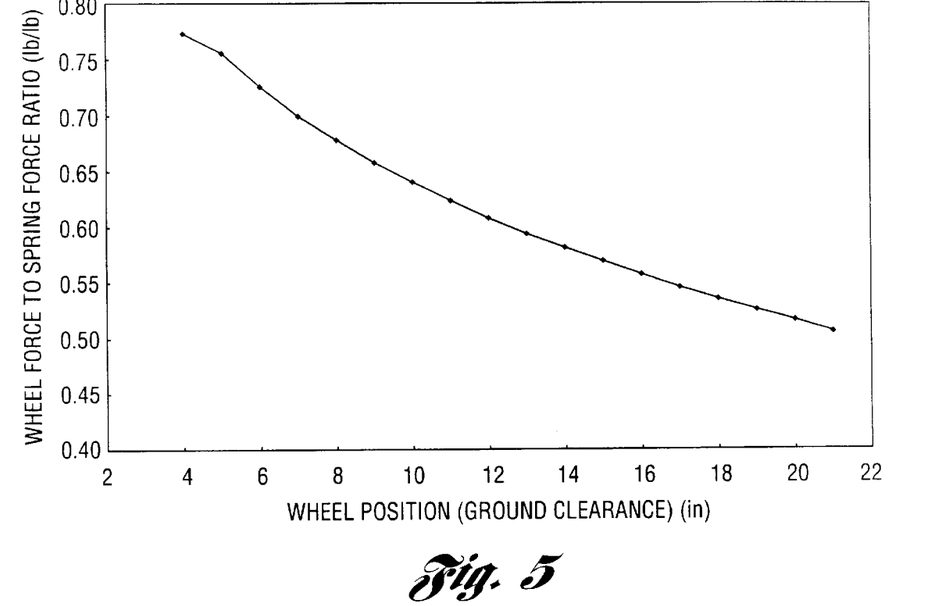
FIG. 5 is a graphic representation showing the relationship of wheel-force-to-spring-force ratio versus ground clearance.

The parallelogram configuration of the suspension assembly 10, combined with a high pivot point and an initial vertical orientation of the linear actuators 24a and 24b provides a favorable suspension force geometry. FIG. 5 shows how the ratio of wheel force to actuator force (before any springing is applied) begins near 0.75 and slowly drops to near 0.5 at maximum extension, or full rebound. This indicates that, as the upper and lower control arms 20 and 22 approach their stowed positions, suspension force is increased by a factor of 1.5 relative to that of static geometry. The geometry's mechanical advantage improves with jounce, reaching 150 percent at full jounce, which enhances suspension spring nonlinearity—the ability to handle large impacts.

As shown in FIGS. 1 and 4, the upper control arm 20 extends between its respective frame and kingpin attachment points 30 and 32 along a generally linear path slightly offset from a line connecting those two points. The lower control arm 22 extends between its respective frame and kingpin attachment points 38 and 40 along an obtusely angled path. The offset configuration of the upper control arm 20 provides clearance between the kingpin assembly 18 and the upper control arm 20 when the adjustable suspension assembly 10 is in its stowed position (FIG. 4). The obtusely angled configuration of the lower control arm 22 provides clearance between the supported end 26 of the upper control arm 20 and the lower control arm 22 when the adjustable suspension assembly 10 is in its stowed position.

With the suspension assembly 10 in the stowed position, the linear actuator 24 is again vertically oriented. The control arms 20 and 22 and the kingpin assembly 18 are configured such that, when in the stowed position, they are relatively vertically oriented and require no more lateral recess space than the linear actuator 24, thus minimizing the lateral intrusion of the suspension assembly 10 into the vehicle 12.

The geometry of the adjustable suspension assembly 10 of the preferred embodiment is such that the required intrusion into the hull of the vehicle 12 to accommodate the entire suspension assembly 10 is only about 5 inches deep by 17 inches wide by 25 inches high. Being side mounted rather than subfloor mounted, the suspension assembly 10 allows full-depth floors between wheels 14. Since the deployment of the wheels 14 provides lateral space, no more space is required for steerable wheels than for nonsteerable wheels.

Figure 6:
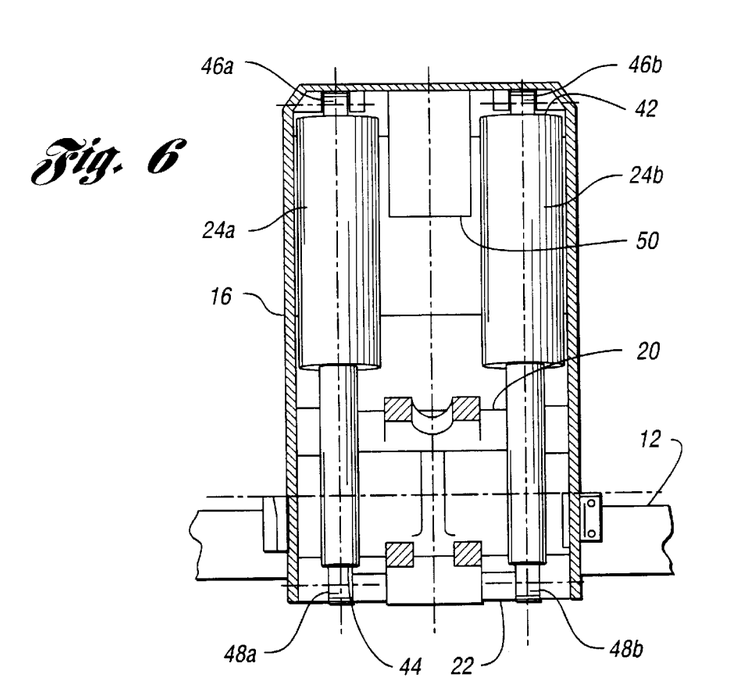
FIG. 6 is a side view of the suspension assembly, portions of which are shown in section, of FIG. 1.

FIG. 6 is a partially sectioned side view of the embodiment of FIG. 1. This view shows the upper control arm 20 and the lower control arm 22 partly in section. The view also shows that the at least one linear actuator 24 of FIG. 1 preferably includes a pair of pneumatically actuated linear actuators 24a and 24b, extending between the frame 16, at the actuator cylinder attachment points 46a and 46b, and the lower control arms 22, at actuator piston attachment points 48a and 48b. As shown, the upper and lower control arms 20 and 22 pass between the linear actuators 24a and 24b. Also shown in FIG. 6, and also mounted between the linear actuators 24a and 24b, is an air reservoir 50. The reservoir 50 can also serve as a final bump stop. The space occupied by the air reservoir 50 can also be used for a pneumatically pressurized overload spring (not shown) or for storing a supplemental volume of gas for pneumatic springs (also not shown).

Figure 7:
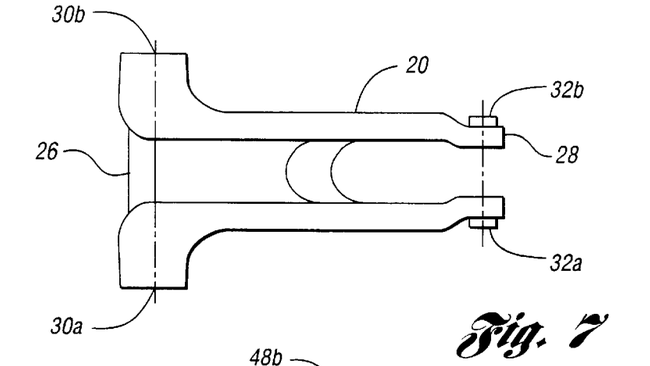
FIG. 7 is a bottom view of the upper control arm of the suspension assembly.
Figure 8:
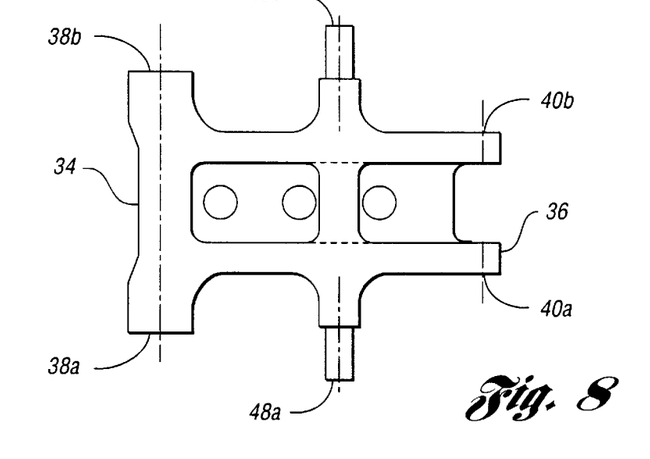
FIG. 8 is a bottom view of the lower control arm of the suspension assembly.

A bottom view of the upper control arm 20 is shown in FIG. 7. Its U-shape provides space for the kingpin assembly 18 to nest within it when the suspension assembly approaches its stowed position. A space could also be provided in the upper control arm 20 to allow space for a half shaft 82. The lower control arm is similarly shown in FIG. 8. It is the main structural element and is linked to the linear actuators 24a and 24b at attachment points 48a and 48b. It should be understood that the configurations shown represent those of typical control arms used and do not represent the only configurations that would function in the present application.

Figure 9:
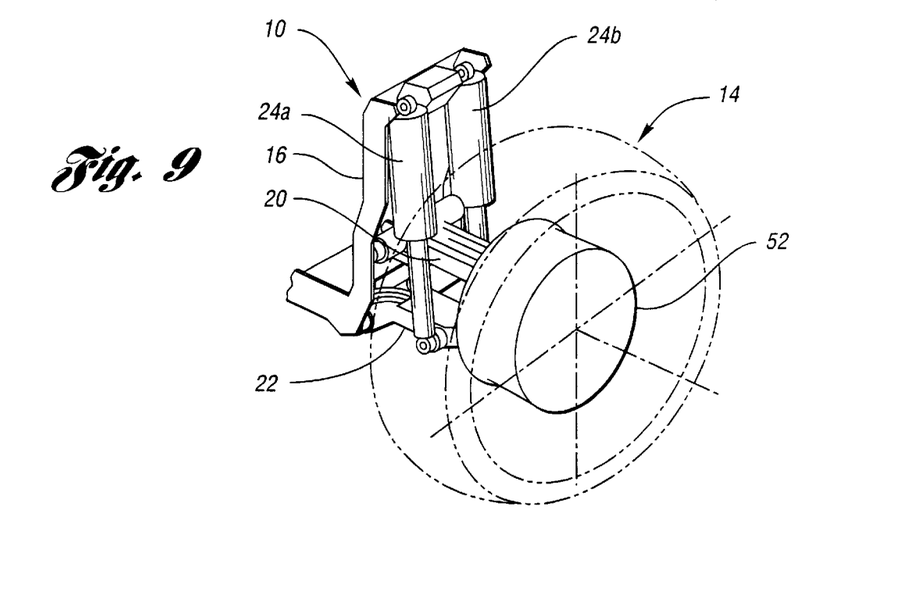
FIG. 9 is a perspective representation of the suspension assembly and wheel assembly of FIG. 1, further including a wheel-mounted electric drive unit.

Shown in FIG. 9 is a perspective representation of the suspension assembly 10 and the wheel assembly 14 and further includes a representation of a wheel-mounted electric drive unit 52. If the vehicle 12 is to be electrically powered, such an electric drive unit 52 would be coupled to each of its driven wheels. Units for providing electric power and for controlling its application to the electric drive units 52 are well known in the art and are not shown.

Figure 10:
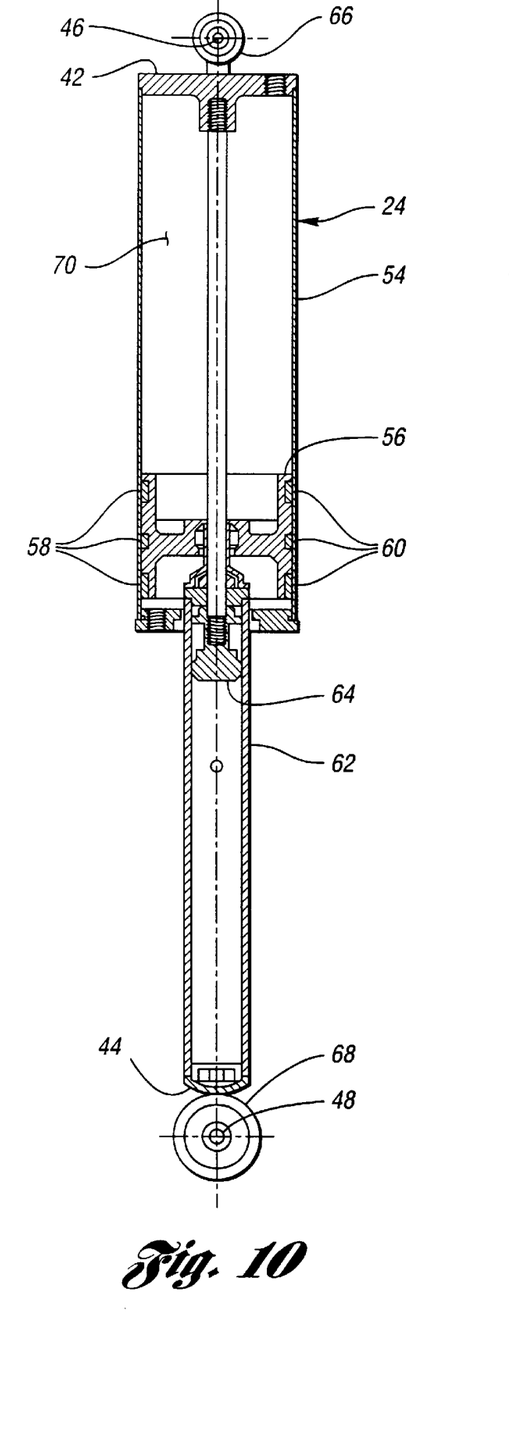
FIG. 10 is a partially sectioned side representation of the major elements of a low-pressure, sliding-piston, linear actuator and a bore shock absorber.
Figure 11:
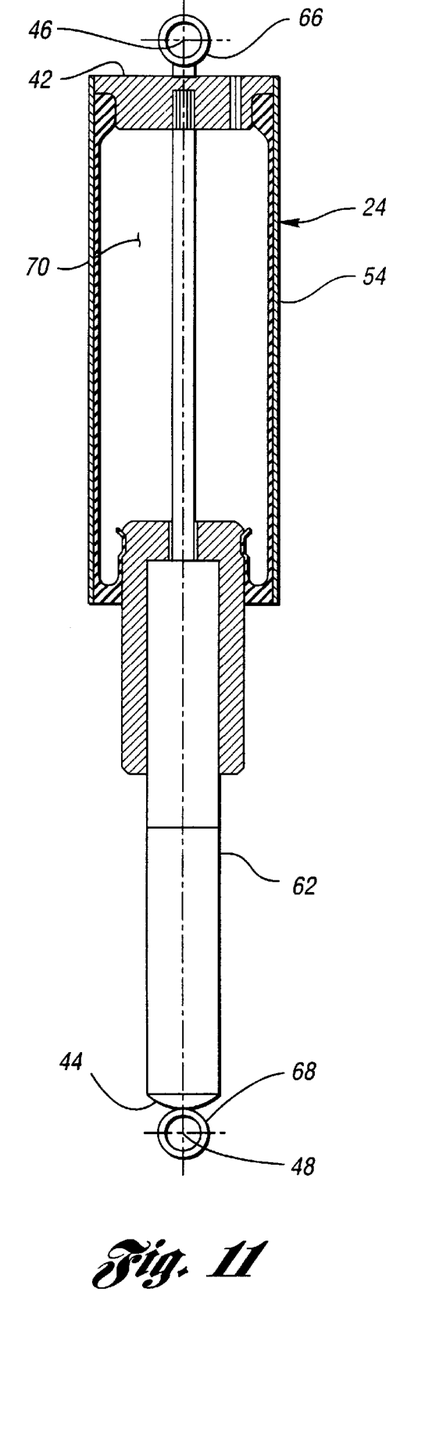
FIG. 11 is a partially sectioned side representation of the major elements of a low-pressure, rolling-lobe, linear actuator and a bore shock absorber.

One of the linear actuators 24 is shown in section in FIG. 10. The linear actuator 24 has a housing 54 within which is slidably disposed a piston 56. A variable displacement pressure chamber 70 is defined by the piston 56 and the housing 54. In the preferred embodiment of the adjustable suspension assembly, the piston 56 has a plurality of annular grooves 58 defined in its outer side. A piston ring 60 is disposed in each of the grooves 58.

A piston connecting shaft 62 is connected to the piston 56 and extends therefrom to the control arm end 44. The connecting shaft 62 has an longitudinal bore within which is disposed a bore shock absorber 64. A mounting fitting 66 is affixed to the linear actuator 24 at its actuator cylinder attachment point 46, and another mounting fitting 68 is affixed to the linear actuator 24 at its actuator piston attachment point 48. In the preferred embodiment, each linear actuator 24a and 24b is actuated pneumatically. Each bore shock absorber 64 is actuated hydraulically.

With reference to FIG. 2, and assuming a starting position wherein the vehicle 12 has a relatively low ground clearance, the adjustable suspension system 10 is set to its cross-country position by applying pressurized gas to the pressure chamber 70 of each of the linear actuators 24. This forces each piston 56, the position of which is indicated by ghost lines, to elongate its associated linear actuator 24. This, in turn, exerts a downward force on the lower control arm 22, which attempts to pivot the lower control arm 22 in an arcuately downward direction about its frame attachment point 38 (FIG. 1).

Since the wheel assembly 14 is resting on the ground 72, however, the reaction force developed thrusts the vehicle 12 upward. Since any movement of the upper and lower control arms 20 and 22 changes the lateral distance between the wheel assemblies 14, adjustments to the suspension system are made while the vehicle 12 is in motion.

As illustrated in FIG. 3, the adjustable suspension system 10 is set to its highway position by reducing the gas pressure applied to the pressure chamber 70 of each of the linear actuators 24. This results in a retraction of each piston 56, the position of which is indicated by ghost lines, and the contraction of its associated linear actuator 24. The vehicle 12 is then allowed to move downward under the force of gravity, decreasing its ground clearance.

When the vehicle 12 is to be shipped or stored, its adjustable suspension system 10 is set to its stowed position by reducing the gas pressure applied to the pressure chamber 70 of each of the linear actuators 24 to zero. This results in a retraction of each piston 56, the position of which is indicated by ghost lines, and the contraction of its associated linear actuator 24. The vehicle 12 is then allowed to move downward under the force of gravity, decreasing its ground clearance and its track width to their minimums. In the preferred embodiment shown, the ground clearance is 4 inches and the wheel assembly is withdrawn within the lateral dimensions of the vehicle 12.

Figure 12:
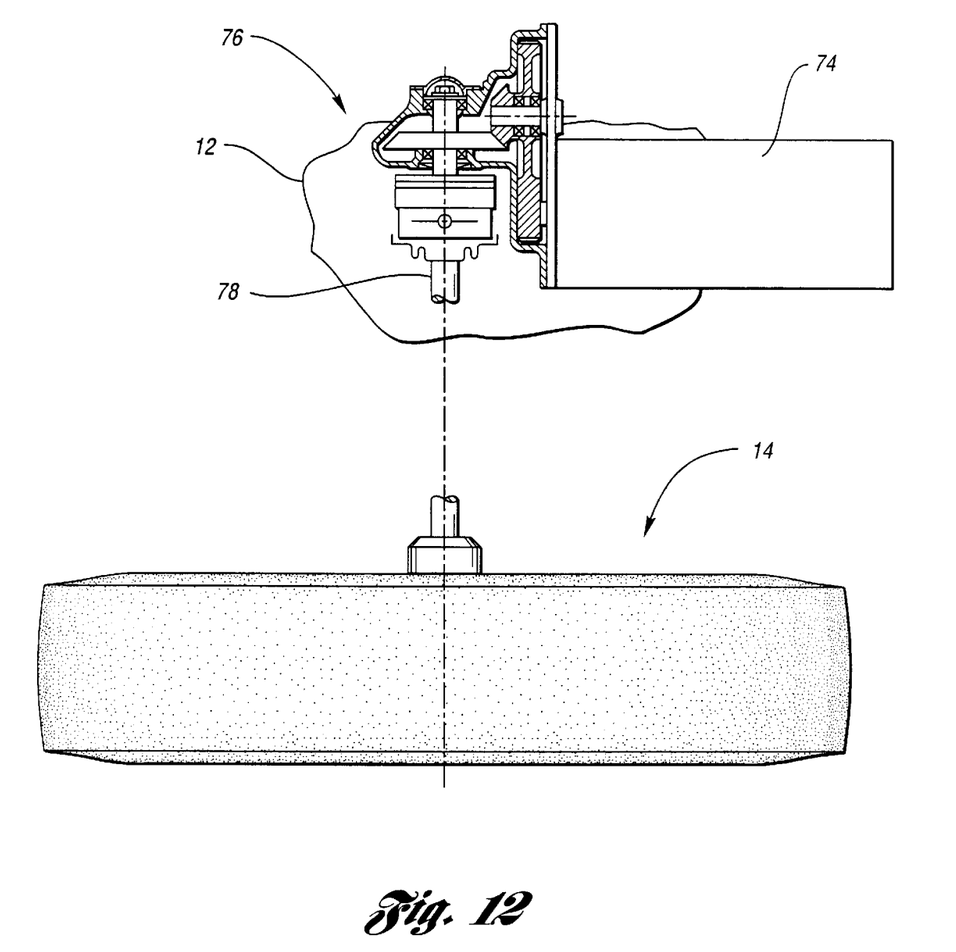
FIG. 12 is a partially sectioned, partially broken away plan view of an alternative, inboard-mounted, electric drive unit and a representation of a wheel assembly.

An alternative apparatus to that shown in FIG. 9 for driving the wheel 14 is shown in FIG. 12. The alternative apparatus shown in FIG. 12 replaces the wheel-mounted electric drive unit 52 shown in FIG. 9 with an inboard-mounted electric drive unit 74. A power transfer assembly, generally indicated by reference numeral 76 and shown partially sectioned, and a half-shaft 78 are also included to transfer drive to a driven wheel 14. The inboard-mounted electric drive unit 74 and/or the power transfer assembly 76 are secured to the vehicle 12 by any of a number of well-known means. The adjustable suspension system 10 used with the alternative apparatus shown in FIG. 12 is essentially the same as that shown in FIG. 1 except that configurations of the upper and lower control arms have been adjusted to accommodate wheel drive elements. The adjustable suspension system 10 shown in FIG. 12 operates in a similar manner to that shown in FIG. 1.

Figure 13:
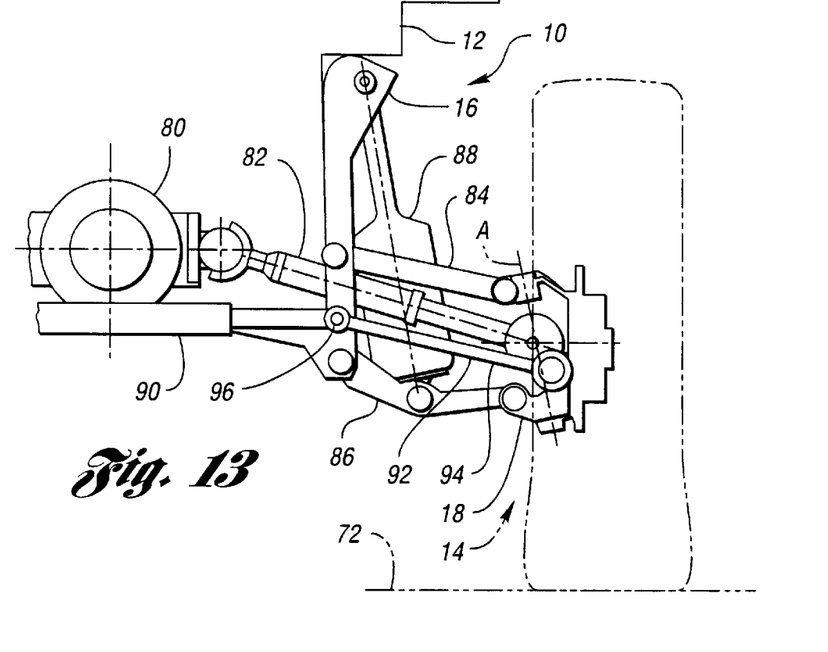
FIG. 13 is an end view, partly in section, of the adjustable suspension assembly of the present invention attached to a vehicle and to a wheel assembly using a mechanical drive shaft, the suspension assembly and using alternative wishbone upper and lower control arms and alternative combination air-strut-and-shock-absorber actuators and being shown in a highway position.
Figure 14:
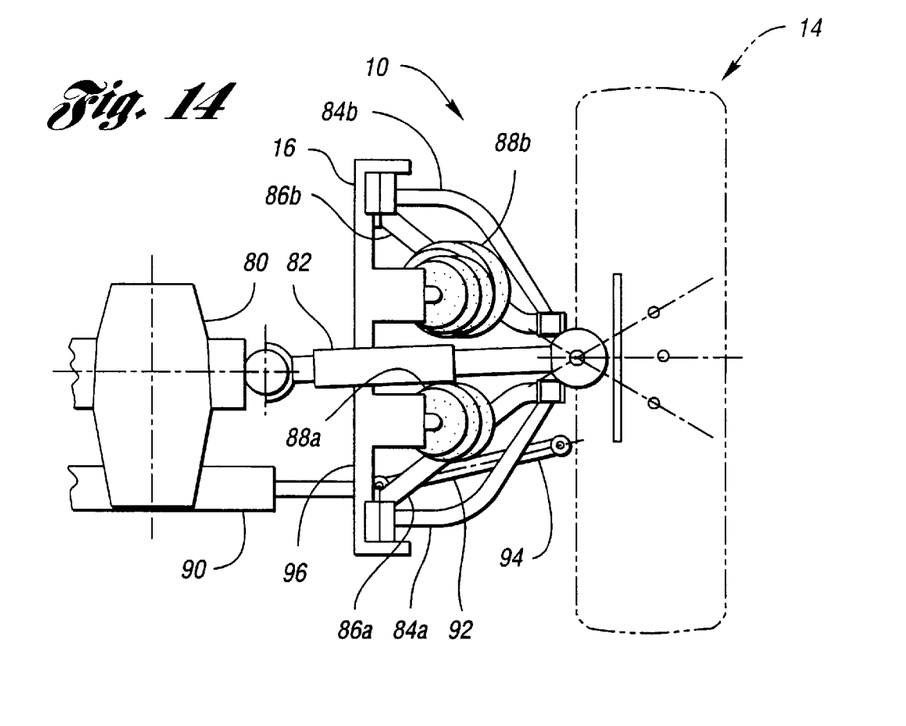
FIG. 14 is a partially sectioned plan view of the adjustable suspension assembly shown in FIG. 13.

Another alternative apparatus to that shown in FIG. 9 for driving the wheel 14 is shown in FIGS. 13 and 14. The alternative apparatus shown in FIGS. 13 and 14 replaces the wheel-mounted electric drive unit 52 shown in FIG. 9 with an engine and an engine power transfer unit 80. Power is transferred to a driven wheel 14 by a half shaft 82.

The adjustable suspension system shown in FIGS. 13 and 14 operates in a similar manner to that shown in FIG. 1. It includes upper control arms 84 and lower control arms 86. As shown in FIG. 14, which is a plan view of FIG. 13, the upper and lower control arms 84 and 86 are wishbone-shaped. This provides space for at least one 88, and preferably two 88a and 88b, combination air strut and shock absorbers. Although shaped differently than the upper and lower control arms 20 and 22 shown in FIG. 1, the upper and lower control arms 84 and 86 nevertheless have respective connections to the frame 16 and to the kingpin assembly 18 that form a parallelogram linkage.

Also shown on FIGS. 13 and 14 are representative rack and pinion assemblies 90 and tie rods 92 pivotally connected thereto at steering rack pivot points 96. Each wheel assembly 14 has a steering axis A about which it is pivoted by an associated tie rod 92. The rack and pinion assemblies 90 and tie rods 92 are, of course, connected only to steerable wheel assemblies 14. An adjustable suspension assembly for use with each nonsteerable wheel assembly 14 includes an elongate link 94 in place of the tie rod 92. The elongate link 94 is pivotally connected to a bracket whose pivot point is coincident to the steering rack pivot point 96 when the latter is positioned for straight-ahead driving.

The elongate link 94 dictates the angular disposition of the wheel 14, prohibiting angular movement of the wheel assembly about its steering axis. The elongate link 94, can be tuned by any of several well-known methods—bracket shims, turnbuckles, adjustable eye bolts, and the like. Although, for the sake of convenience, the elongate link 94 is shown only in FIGS. 13 and 14, it should be understood that the same techniques for mounting and tuning it apply to all the preferred versions shown in other figures.

While the best mode for carrying out the invention has been described in detail, those familiar with the art to which this invention relates will recognize various alternative designs and embodiments for practicing the invention as defined by the following claims.

What is claimed is:

1. An adjustable, modular suspension assembly for connecting a wheel assembly to a vehicle, the suspension assembly comprising:

a frame that is attachable to the vehicle;

a kingpin assembly that is attachable to the wheel assembly;

upper and lower control arms having respective connections to the frame and to the kingpin assembly to provide a parallelogram linkage; and at least one linear actuator having a frame end pivotally connected to the frame above the upper control arm and having a control arm end pivotally connected to a central portion of the lower control arm, the upper and lower control arms being configured to swing upwardly past the at least one linear actuator, under urging of the latter, until the at least one linear actuator moves into a vertically oriented stowed position within a recess, folding the adjustable, modular suspension assembly into a configuration having a lateral dimension effectively equal to the diameter of the at least one linear actuator, the wheel assembly at this point being simultaneously located at its maximum upward and its minimum lateral dispositions, the upper and lower control arms also being configured to swing downwardly to a point where they are horizontally disposed, the wheel assembly at this point being extended to its maximum lateral disposition, and to swing farther downwardly until the at least one linear actuator moves into a vertically oriented nonstowed position, the wheel assembly at this point being extended to its maximum downward disposition.

2. The adjustable, modular suspension assembly as defined by claim 1, wherein the geometry thereof provides the upper and lower control arms with at least 120 degrees of angular displacement from vertical about their respective connections to the frame.

3. The adjustable, modular suspension assembly as defined by claim 2, wherein the at least one linear actuator includes a pair of linear actuators.

4. The adjustable, modular suspension assembly as defined by claim 3, wherein the upper and lower control arms are configured to swing between the pair of linear actuators.

5. The adjustable, modular suspension assembly as defined by claim 4, wherein the upper control arm and the lower control arm are each formed as a single unit.

6. The adjustable, modular suspension assembly as defined by claim 4, wherein the recess is disposed within the side of the vehicle.

7. The adjustable, modular suspension assembly as defined by claim 3, wherein the upper and lower control arms are wishbone-shaped, the upper control arm being configured to swing outside the linear actuators.

8. The adjustable, modular suspension assembly as defined by claim 7, wherein the upper control arm and the lower control arm are each formed of two separate members.

9. The adjustable, modular suspension assembly as defined by claim 7, wherein the recess is disposed within the side of the vehicle.

10. The adjustable, modular suspension assembly as defined by claim 7, wherein each of the pair of linear actuators is a combination air-strut-and-shock-absorber actuator.

11. The adjustable, modular suspension assembly as defined by claim 3, further including a shock absorber for each of the pair of linear actuators, the shock absorbers being disposed to damp relatively vertical motion between the wheel assembly and the frame.

12. The adjustable, modular suspension assembly as defined by claim 11, wherein each of the pair of linear actuators has a frame end and a control arm end, a cylinder housing extending from the frame end, a piston slidably disposed within the cylinder housing, a piston connecting shaft having a longitudinal bore therein being connected to the piston and extending therefrom to the control arm end, the shock absorber being disposed within the longitudinal bore, thereby damping relatively vertical motion between the wheel assembly and the frame.

13. The adjustable, modular suspension assembly as defined by claim 11, wherein each of the pair of shock absorbers is hydraulically actuated.

14. The adjustable, modular suspension assembly as defined by claim 3, wherein each of the pair of linear actuators is a sliding-piston actuator.

15. The adjustable, modular suspension assembly as defined by claim 3, wherein each of the pair of linear actuators is a rolling-lobe actuator including an air bag sealed within a cylindrical housing.

16. The adjustable, modular suspension assembly as defined by claim 3, wherein the at least one linear actuator is pneumatically actuated.

17. The adjustable, modular suspension assembly as defined by claim 1, wherein the wheel assembly has a steering axis about which it pivots as dictated by a tie rod attached to the wheel assembly.

18. The adjustable, modular suspension assembly as defined by claim 1, further including an elongate link connected between the frame and the wheel assembly to prevent the wheel assembly from pivoting.

\* \* \* \* \*